United States Patent
Liu et al.

(10) Patent No.: US 9,729,595 B2
(45) Date of Patent: Aug. 8, 2017

(54) METHOD, APPARATUS, AND SYSTEM FOR TRANSMITTING MEDIA DATA BASED ON OTT

(71) Applicant: HUAWEI TECHNOLOGIES CO., LTD., Shenzhen, Guangdong (CN)

(72) Inventors: Jitao Liu, Shenzhen (CN); Hewen Zheng, Nanjing (CN); Haibin Chen, Shenzhen (CN); Ning Zong, Nanjing (CN); Qin Wu, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 559 days.

(21) Appl. No.: 14/140,176

(22) Filed: Dec. 24, 2013

(65) Prior Publication Data
US 2014/0115062 A1   Apr. 24, 2014

Related U.S. Application Data

(63) Continuation of application No. PCT/CN2011/076626, filed on Jun. 30, 2011.

(51) Int. Cl.
| G06F 15/16 | (2006.01) |
| H04L 29/06 | (2006.01) |
| H04L 29/08 | (2006.01) |

(52) U.S. Cl.
CPC ........ *H04L 65/60* (2013.01); *H04L 29/08729* (2013.01); *H04L 65/4084* (2013.01);
(Continued)

(58) Field of Classification Search
CPC ............... H04L 65/60; H04L 29/08279; H04L 65/4084; H04L 67/1008; H04L 67/1021; H04L 67/2842
See application file for complete search history.

(56) References Cited

U.S. PATENT DOCUMENTS

| 6,694,358 B1 | 2/2004 | Swildens et al. |
| 2003/0145066 A1* | 7/2003 | Okada ............... H04L 29/12009 709/219 |

(Continued)

FOREIGN PATENT DOCUMENTS

| CN | 1489069 A | 4/2004 |
| CN | 101902279 A | 12/2010 |
| WO | 2010/082121 A1 | 7/2010 |

OTHER PUBLICATIONS

Extended European Search Report dated Mar. 7, 2014 in corresponding European Patent Application No. 11857476.3.

(Continued)

*Primary Examiner* — June Sison
*Assistant Examiner* — Steven Nguyen
(74) *Attorney, Agent, or Firm* — Staas & Halsey LLP (57) ABSTRACT

A method, an apparatus, and a system for transmitting media data based on OTT are disclosed. The method includes: receiving, by an OTT server, a media data request initiated by a user terminal, where the OTT server is connected to at least one cache server; determining, by the OTT server, a cache server from the at least one cache server according to a location and/or a capability of the at least one cache server; sending, by the OTT server, a notification message, which carries session information, to the user terminal and the determined cache server, so that the determined cache server receives a media data request, which carries session information, from the user terminal, and sends corresponding media data to the user terminal.

12 Claims, 5 Drawing Sheets

(52) U.S. Cl.
CPC ...... *H04L 67/1008* (2013.01); *H04L 67/1021* (2013.01); *H04L 67/2842* (2013.01)

(56) References Cited

U.S. PATENT DOCUMENTS

| | | | |
|---|---|---|---|
| 2008/0104268 A1* | 5/2008 | Farber | G06F 9/505 709/233 |
| 2009/0248893 A1 | 10/2009 | Richardson et al. | |
| 2012/0240176 A1* | 9/2012 | Ma | H04N 21/23439 725/114 |

OTHER PUBLICATIONS

International Search Report issued Apr. 12, 2012, in corresponding International Patent Application No. PCT/CN2011/076626.
International Search Report, dated Apr. 12, 2012, in corresponding International Application No. PCT/CN2011/076626 (4 pp.).

* cited by examiner

METHOD, APPARATUS, AND SYSTEM FOR TRANSMITTING MEDIA DATA BASED ON OTT

CROSS-REFERENCE TO RELATED APPLICATIONS

This application is a continuation of International Application No. PCT/CN2011/076626, filed on Jun. 30, 2011, which is hereby incorporated by reference in its entirety.

TECHNICAL FIELD

The present invention relates to the field of communications technologies, and in particular, to a method, an apparatus and a system for transmitting media data based on OTT.

BACKGROUND

An OTT (Over The Top, over the Internet) refers to a service of providing a service based on the Internet. To be specific, a user obtains a service through broadband Internet access. Currently, an OTT on-demand service has contribute to the majority of network traffic.

With the increase of the number of OTT on-demand services, the prior art uses traffic grooming to reduce pressure that the traffic imposes on a bearer network. Considering that current OTT videos are mainly delivered by using a commercial CDN (Content Delivery Network, content delivery network) but the traffic and flow direction on the commercial CDN are beyond the control of an operator, the operator implements localization of OTT traffic by establishing a transparent cache system.

The transparent cache system caches media data replied by a server; when a request with respect to the content is received from a user subsequently, the corresponding content is obtained directly from the transparent cache system to reply to the user, without the need of requesting the content from the server providing a service, thereby saving network traffic from the transparent cache system to the server.

Figure 1:
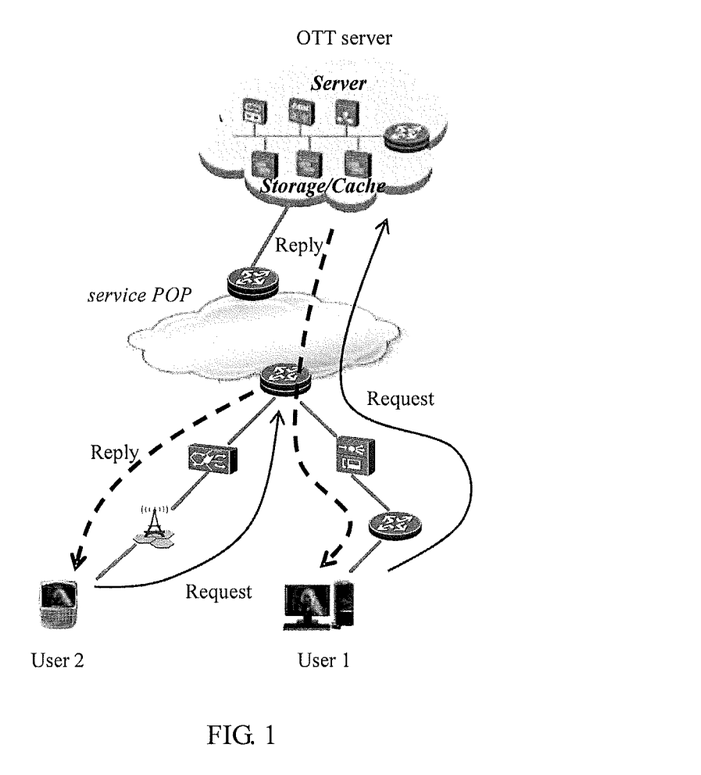
FIG. 1 is a schematic diagram illustrating a scenario where a user terminal accesses an OTT server to request media data in the prior art.

As shown in FIG. 1, a user terminal 1 (end user 1) requests media data from an OTT server, and the request is forwarded to the server through an intermediate network device (service POP), where the network device has an embedded transparent cache system; when a request is received subsequently, the network device redirects a request packet with respect to the OTT server to the embedded transparent cache system; after finding that the content requested by the user terminal 1 is unavailable locally, the transparent cache system sends a request packet to the OTT server and sends a media data reply provided by the OTT server to the user terminal 1; after the packet of the same content requested by a user terminal 2 (end user 2) from the OTT server is redirected by the network device to the transparent cache system, the transparent cache system replies to the user terminal 2 (end user 2) directly by using cached content.

Because the access transaction of a user terminal may be terminated by the transparent cache system and cannot reach the OTT server, an OTT service provider cannot count media data access of the user terminal, for example, access times, access time, and the like. In addition, because the access request of the user terminal is directly replied by the transparent cache system and the corresponding access request cannot reach the OTT server, the OTT service provider cannot control access content and the transparent cache system also suffers the security risk of attack caused by masses of requests.

SUMMARY

Embodiments of the present invention provide a method, an apparatus, and a system for transmitting media data based on OTT, so that the controllability of an OTT server on a media data request and content transmission can be increased.

The technical solutions of the present invention are as follows:

An embodiment of the present invention provides method for transmitting media data based on over the top (OTT), where the method includes:

receiving, by an OTT server, a media data request initiated by a user terminal, where the OTT server is connected to at least one cache server;

determining, by the OTT server, a cache server from the at least one cache server according to a location and/or a capability of the at least one cache server; and sending, by the OTT server, a notification message, which carries session information, to the user terminal and the determined cache server, so that the determined cache server receives a media data request, which carries session information, from the user terminal and sends corresponding media data to the user terminal.

An OTT server is provided, where the OTT server is connected to at least one cache server, and the OTT server includes:

a first port, configured to receive a media data request from a user terminal;

a determining unit, configured to determine a cache server from the at least one cache server according to a location and/or a capability of the at least one cache server; and a second port, configured to send a notification message, which carries session information, to the determined cache server and the user terminal.

A cache server is provided, where the cache server is connected to an over the top (OTT) server, and the cache server includes:

a network side interface unit, configured to receive, from the OTT server, a notification message, which carries session information, from the OTT server;

a first user side interface unit, configured to receive a media data request, which carries session information, from a user terminal;

a controlling unit, configured to determine whether the session information from the OTT server matches the session information from the user terminal; and a second user side interface unit, configured to send corresponding media data to the user terminal when the session information from the OTT server matches the session information from the user terminal.

A system for transmitting media data based on OTT is provided, which includes a user terminal, an OTT server, and at least one cache server, where:

the OTT server is configured to receive a media data request initiated by the user terminal, determine a cache server from the at least one cache server according to a location and/or a capability of the at least one cache server, and send a notification message, which carries session information, to the user terminal and the determined cache server; and the cache server is configured to receive a media data request, which carries session information, from the user terminal, and send corresponding media data to the user terminal.

In the embodiments of the present invention, a media data request initiated by a user terminal is firstly directed to an OTT server, so that the OTT server can select a corresponding cache server with respect to a specific user to push media data; then, the user terminal is controlled to re-initiate a media data request, which carries specific session information, to a cache server, and the cache server pushes media data to the user terminal according to the request. In this way, the OTT server can detect each media data request of the user terminal, so that each media data request of the user terminal is controlled and the controllability on media data transmission is increased.

DESCRIPTION OF EMBODIMENT

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 2:
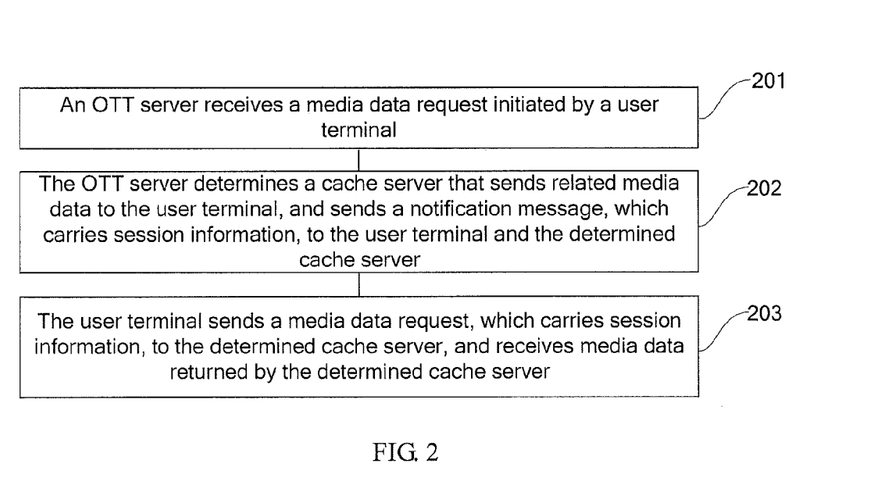
FIG. 2 is a schematic flowchart of a method for transmitting media data based on OTT according to an embodiment of the present invention.

An embodiment of the present invention provides a method for transmitting media data based on OTT. As shown in FIG. 2, the method may include the following steps:

Step 201: An OTT server receives a media data request initiated by a user terminal.

The OTT server is connected to a cache server, where the cache server has an embedded cache system and stores related media data, and the media data may be sent by the OTT server.

Generally, the cache server needs to register its own location and capability (for example, a covered end user subnet, a supported streaming protocol, storage capacity, and the like) with the OTT server. In addition, the registration service may be firstly reported by a service POP to an operator management system for summarization, and then be notified by the operator management system to the OTT server.

Step 202: The OTT server determines a cache server that sends related media data to the user terminal, and sends a notification message, which carries session information, to the user terminal and the determined cache server.

In the embodiment of the present invention, after an OTT server receives a media data request initiated by a user terminal, if the media data request of the user terminal is admitted, the OTT server determines a cache server that sends related media data to the user terminal. In the specific implementation process, the criterion of selecting a cache server may be as follows: A closest cache server is selected according to access locations of cache servers, or according to cache servers' capabilities of providing data services, a proper server is selected to deliver media data.

To increase the controllability of the OTT server on a media data request and content transmission, the OTT server generates corresponding session information according to a media data request initiated by a current user terminal. According to an actual application scenario, the session information may specifically include one or more pieces of the following information: a user identifier describing user validity, a session identifier describing charging validity, a content identifier describing copyright license validity, copyright information describing a copyright control manner, charging information describing a charging mode, information describing a feedback information requirement upon the completion of a media data service, information describing a duration of a permitted user access state, the number of concurrent connections, and the like.

After the session information is generated, the OTT server sends a notification message, which carries the session information, to the user terminal and the determined cache server to notify the user terminal that a media data request carrying the session information needs to be re-initiated to the cache server and notify the cache server that a media data request initiated by any user terminal to the cache server must carry the session information.

Step 203: The user terminal sends a media data request, which carries session information, to the determined cache server, and receives media data returned by the determined cache server.

After receiving a notification message, the user terminal re-initiates a media data request, which carries session information, to the determined cache server, and the cache server sends related media data to the user terminal according to the media data request.

In the embodiment of the present invention, a media data request initiated by a user terminal is firstly directed to an OTT server, so that the OTT server can select a corresponding cache server with respect to a specific user, to push media data; then, the user terminal is controlled to re-initiate a media data request, which carries specific session information, to a cache server, and the cache server pushes media data to the user terminal according to the request. In this way, the OTT server can detect each media data request of the user terminal, so that each media data request of the user terminal is controlled and the controllability on media data transmission is increased.

In an actual application scenario, the OTT server can push related media data to a cache server in unicast mode. When there are multiple cache servers connected to the OTT server, the OTT server can push related media data to all the cache servers in multicast mode.

It should be noted that generally, after the OTT server receives a media data request initiated by a user terminal, the OTT server needs to perform authentication for the user terminal to determine whether the media data request initiated by the user terminal can be admitted. A corresponding authentication manner may include such security processing as firewall filtering and anti-attack filtering, user identity authentication, program selection and authorization, and charging. After related authentication succeeds, the OTT server can determine that the media data request is a legal request, and then begin to confirm session information subsequently.

In addition, at the side of the cache server, after receiving a notification message which carries session information and is sent by the OTT server, the cache server stores the session information; after receiving the media data request which carries the corresponding session information and is initiated by the user terminal, the OTT server still needs to perform authentication for the user terminal. In this case, the authentication manner may be as follows: The session information carried in the media data request of the user terminal is compared with the session information carried in the notification message from the OTT server; if the content of the two matches, it is considered that the user initiates the access request in the access time permitted and within the number of permitted connections to a permitted content source, and then it can be determined that the user terminal is an authorized user and a media data service is permitted to be provided to the user terminal; then, corresponding media data is sent to the user terminal according to the request of the user terminal.

To further enhance the controllability of the OTT server on a media data request and content transmission, the cache server reports related statistics information of current media data transmission to the OTT server after the user terminal stops obtaining corresponding media data, for example, access duration, access frequency, average bandwidth, traffic statistics, and quality statistics. The user terminal stops obtaining corresponding media data when the cache server finishes transmitting a media data service to the user terminal. In addition, the user terminal disconnects a network connection from the cache server due to a network fault or other causes, so that the user terminal stops obtaining corresponding media data. In the embodiment of the present invention, the cache server may report related statistics information of current media data transmission to the OTT server when the user terminal stops obtaining corresponding media data; or the cache server may report related statistics information of current media data transmission to the OTT server at an interval after the user terminal stops obtaining corresponding media data. The reporting manner is not specifically limited by the embodiment of the present invention and can be set according to an actual application scenario.

To fully understand the technical solutions provided in the embodiments of the present invention, the technical solutions provided in the embodiments of the present invention are clearly and completely described in the following with reference to the accompanying drawings in the embodiments of the present invention.

Figure 3:
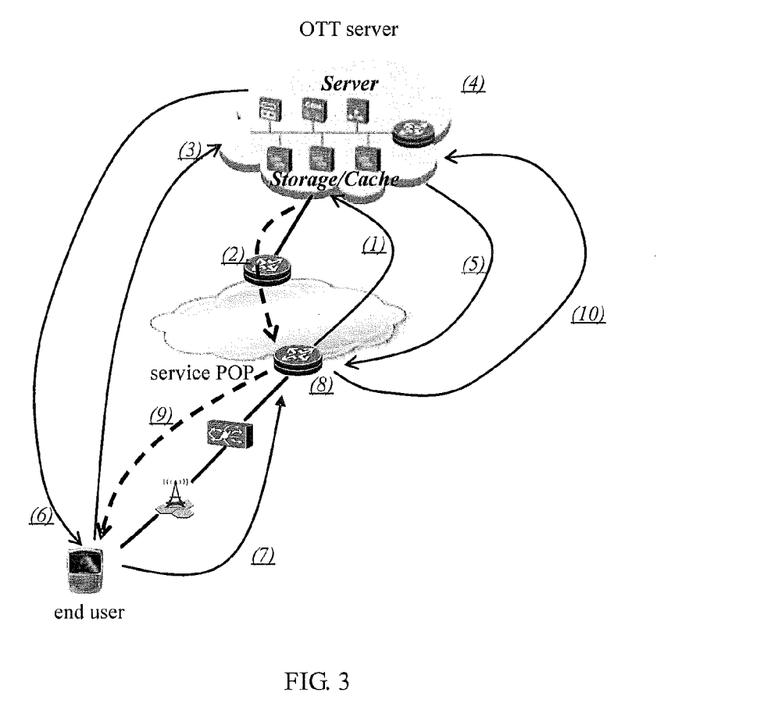
FIG. 3 is a schematic diagram illustrating an application scenario where a user terminal accesses a YouKu website according to an embodiment of the present invention.

FIG. 3 illustrates the above process of transmitting media data based on the OTT by using an application scenario where a user terminal accesses a website.

In FIG. 3, an OTT server is a server providing a video service of a website service provider (including a homepage framework server, a program management server, a user authentication server, a charging server, a content storage server, an advertising decision server, an advertisement storage server, or the like). The OTT server is connected to an intermediate network device (service POP), that is, a cache server, where a cache system is embedded in the network device.

Figure 4:
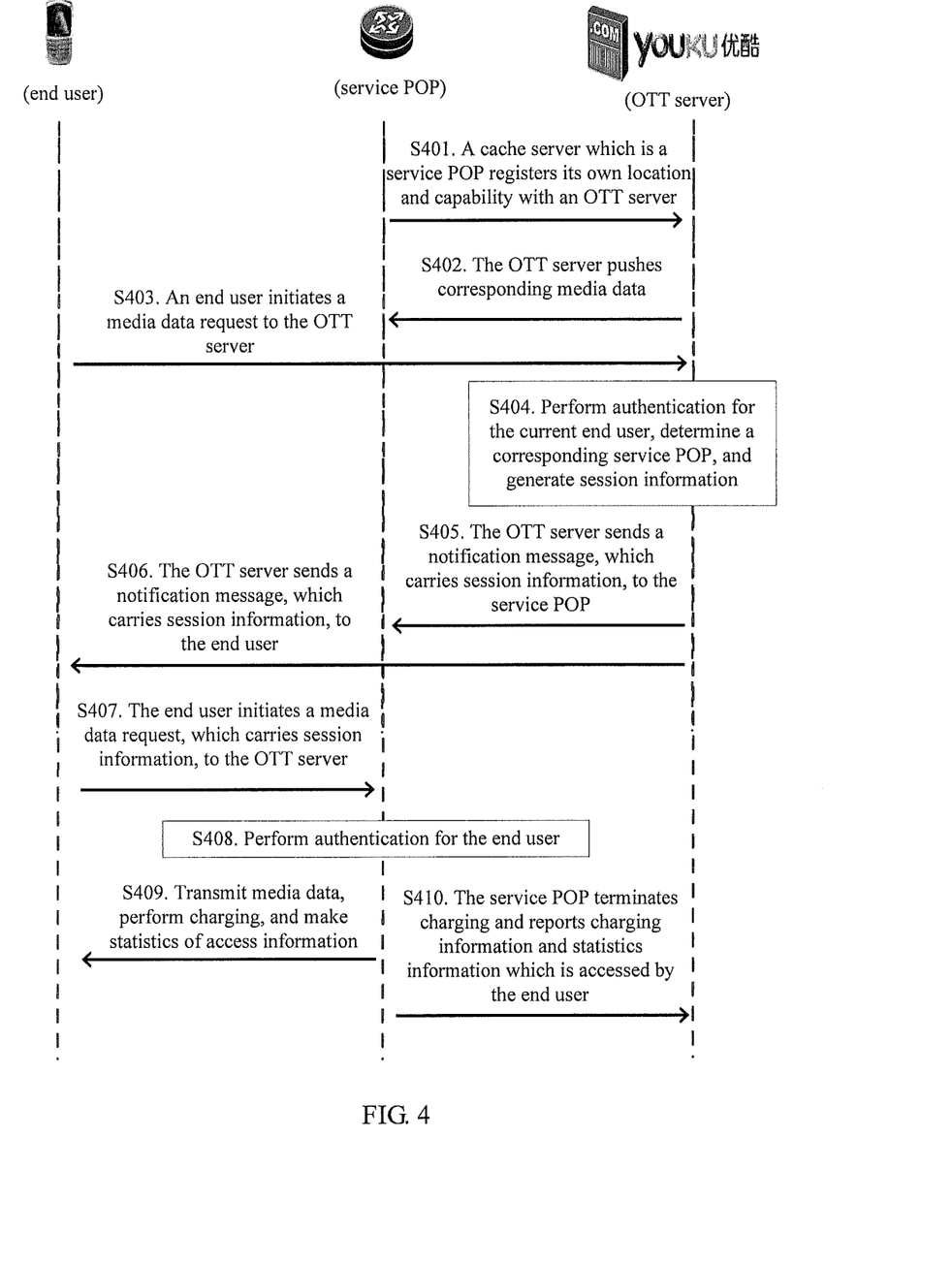
FIG. 4 is a schematic flowchart of transmitting data to a user by an OTT server of a YouKu website according to a media data request initiated by the user according to an embodiment of the present invention.

For details about a specific process in which the OTT server of a website transmits data to a user according to a media data request initiated by the user, reference may be made to FIG. 4, which specifically includes the following steps:

S401. A cache server which is a service POP registers its own location and capability (for example, a covered end user subnet, a supported streaming protocol, storage capacity, and the like) with an OTT server, so that the OTT server learns each piece of parameter information of the cache server.

Of course, the registration may be firstly reported by the service POP to an operator management system for summarization, and then may be notified by the operator management system to the OTT server provided by a website service provider.

In addition, the OTT server can be connected to multiple service POPs at the same time generally.

S402. The OTT server pushes corresponding media data to the service POP in multicast or unicast mode.

S403. A user terminal (end user) initiates a media data request to the OTT server, where the request is directed to the OTT server directly.

S404. After receiving the media data request initiated by the end user, the OTT server performs such security processing as firewall filtering and anti-attack filtering, user authentication, program selection and authorization, and charging to perform authentication for the current end user.

If the media data request initiated by the current end user is admitted by the OTT server, the OTT server selects a corresponding service POP, which provides media data content, for the end user based on service POPs' access locations or capabilities of providing data services.

The OTT server generates corresponding session information according to a media data request initiated by the current user terminal, where the session information may specifically include one or more pieces of the following information: a user identifier describing user validity, a session identifier describing charging validity, a content identifier describing copyright license validity, copyright information describing a copyright control manner, charging information describing a charging mode, information describing a feedback information requirement upon the completion of a media data service, information describing a duration of a permitted user access state, and the number of concurrent connections.

In the specific implementation, the session information may be described by using a plain text or an agreed format and the session information is transmitted after it is encrypted by using a secure and unique identifier.

S405. The OTT server sends a notification message, which carries session information, to the service POP to notify the service POP of the following: A user request is valid in a duration within which user access is permitted, which is specified by the session information; a user request carrying a user identifier specified by the session information is valid in terms of user identity; a user request carrying a session identifier specified by the session information is valid in terms of charging information; a user request carrying a content identifier specified by the session information is valid in terms of content copyright access. Only when all these validities are confirmed, the access request of the end user can be admitted by the service POP and a service can be provided.

S406. The OTT server sends a notification message, which carries session information, to the end user to notify the end user that a media data request carrying the session information needs to be re-initiated to the corresponding service POP and that the end user needs to be redirected to the service POP to obtain media content.

The session information carries an IP address and/or a URI (Uniform Resource Identifier, uniform resource identifier) of the corresponding service POP. After receiving the session information, the end user can locate the corresponding service POP according to the carried IP address and/or URI of the corresponding service POP.

S407. The end user initiates a media data request, which carries session information, to the OTT server.

S408. The service POP compares the session information from the OTT server in step S405 with the session information carried in the media data request initiated by the end use; if the content of the two matches, it is verified that the end user is an authorized user recognized by the OTT server and specified content is permitted to be provided to the end user.

S409. The media data content requested by the end user is transmitted from the service POP to the end user; the service POP performs corresponding charging and makes statistics of access information according to a policy provided by the OTT server.

S410. After the end user stops obtaining the corresponding media data (for example, because content transmission is completed or a network connection between the end user and the service POP is disconnected), the service POP terminates charging and reports the charging information and statistics information which is accessed by the end user, for example, access duration, access frequency, average bandwidth, traffic statistics, quality statistics, and the like.

According to the foregoing embodiment, a media data request initiated by a user terminal is firstly directed to an OTT server, so that the OTT server can select a corresponding cache server with respect to a specific user, to push media data; then, the user terminal is controlled to re-initiate a media data request, which carries specific session information, to a cache server, and the cache server pushes media data to the user terminal according to the request. In this way, the OTT server can detect each media data request of the user terminal, so that each media data request of the user terminal is controlled and the controllability on media data transmission is increased.

In the embodiment of the present invention, because the OTT server firstly performs such content access control as security filtering and authentication processing for a user, the cache server only needs to compare whether the session information carried by the user matches the session information from the OTT server, and content access control can be completed, thereby avoiding the security risk that the cache server is attacked by masses of requests.

In addition, all user access requests reach the OTT server and all session statistics information, such as access duration, access frequency, average bandwidth, traffic statistics, and quality statistics, is notified by the cache server to the OTT server. Therefore, with the technical solution, the problem that an OTT service provider cannot count the times and duration of video access of an end user under a transparent cache mechanism can be solved.

Accordingly, an embodiment of the present invention provides a system for transmitting media data based on OTT.

Figure 5:
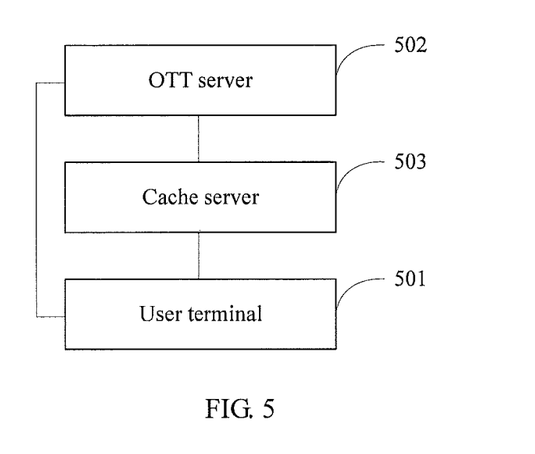
FIG. 5 is a schematic structural diagram of a system for transmitting media data based on OTT according to an embodiment of the present invention.

As shown in FIG. 5, the system may specifically include a user terminal 501, an OTT server 502, and at least one cache server 503, where the cache server 503 is connected to the OTT server 502, has an embedded cache system and stores media data.

The OTT server 502 is configured to receive a media data request initiated by the user terminal 501, determine a cache server 503, which sends related media data to the user terminal 501, from the at least one cache server according to a location and/or a capability of the at least one cache server, and send a notification message, which carries session information, to the user terminal 501 and the corresponding cache server 503.

The cache server 503 is configured to receive the media data request, which carries session information, from the user terminal 501, and send corresponding media data to the user terminal 501.

Generally, the cache server needs to register its own location and capability (for example, a covered end user subnet, a supported streaming protocol, storage capacity, and the like) with the OTT server.

After the OTT server receives a media data request initiated by a user terminal, if the media data request of the user terminal is admitted, the OTT server determines a cache server that sends related media data to the user terminal. In the specific implementation process, the criterion of selecting a cache server may be as follows: A closest cache server is selected according to access locations of cache servers, or according to cache servers' capabilities of providing data services, a proper server is selected to deliver media data.

To increase the controllability of the OTT server on a media data request and content transmission, the OTT server generates corresponding session information according to a media data request initiated by a current user terminal. According to an actual application scenario, the session information may specifically include one or more pieces of the following information: a user identifier describing user validity, a session identifier describing charging validity, a content identifier describing copyright license validity, copyright information describing a copyright control manner, charging information describing a charging mode, information describing a feedback information requirement upon the completion of a media data service, information describing a duration of a permitted user access state, and the number of concurrent connections.

After the session information is generated, the OTT server sends a notification message, which carries session information, to the user terminal and the determined cache server to notify the user terminal that a media data request carrying the session information needs to be re-initiated to the cache server and notify the cache server that any user terminal initiating a media data request to the cache server must carry the session information. After receiving the notification message, the user terminal re-initiates a media data request, which carries session information, to the cache server, and the cache server sends related media data to the user terminal according to the media data request.

Obviously, in the system provided in the embodiment of the present invention, a media data request initiated by a user terminal is firstly directed to an OTT server, so that the OTT server can select a corresponding cache server with respect to a specific user, to push media data; then, the user terminal is controlled to re-initiate a media data request, which carries specific session information, to a cache server, and the cache server pushes media data to the user terminal according to the request. In this way, the OTT server can detect each media data request of the user terminal, so that each media data request of the user terminal is controlled and the controllability on media data transmission is increased.

In an actual application scenario, the OTT server can push related media data to a cache server in unicast mode. When there are multiple cache servers connected to the OTT server, the OTT server can push related media data to all the cache servers in multicast mode.

In addition, after the OTT server receives a media data request initiated by a user terminal, the OTT server needs to perform authentication for the user terminal to determine whether the media data request initiated by the user terminal can be admitted.

However, at the side of the cache server, after receiving a notification message which carries session information and is sent by the OTT server, the cache server stores the session information; after receiving the media data request which carries corresponding session information and is initiated by the user terminal, the OTT server still needs to perform authentication for the user terminal. The session information carried in the received media data request initiated by the user terminal is compared with the session information carried in the notification message received by the cache server; if the content of the two matches, the user initiates the access request in the access time permitted and within the number of permitted connections to a permitted content source, and then it can be determined that the user terminal is an authorized user and a media data service is permitted to be provided to the user terminal; then, corresponding media data is sent to the user terminal according to the request of the user terminal.

Finally, to further enhance the controllability of the OTT server on a media data request and content transmission, the cache server reports related statistics information of current media data transmission to the OTT server after the user terminal stops obtaining corresponding media data.

Figure 6:
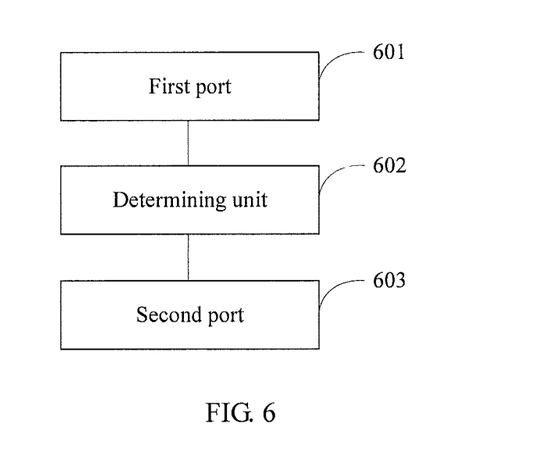
FIG. 6 is a schematic structural diagram of an OTT server according to an embodiment of the present invention.

Accordingly, an embodiment of the present invention further provides an OTT server. As shown in FIG. 6, the server may specifically include:

a first port 601, configured to receive a media data request from a user terminal;

a determining unit 602, configured to determine a cache server from at least one cache server according to a location and/or a capability of the at least one cache server; and a second port 603, configured to send a notification message, which carries session information, to the determined cache server and the user terminal.

Figure 7:
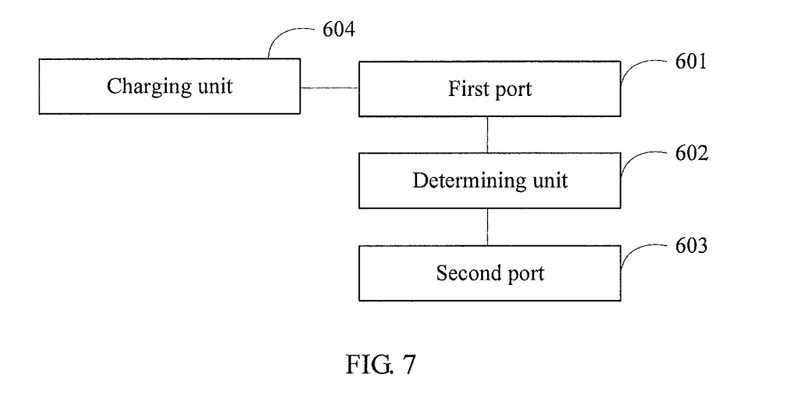
FIG. 7 is a schematic structural diagram of another OTT server according to an embodiment of the present invention.

As shown in FIG. 7, the OTT server provided in this embodiment may further include a charging unit 604, where the first port 601 is further configured to receive statistics information from the cache server and the charging unit 604 is configured to charge the user terminal according to the statistics information.

Figure 8:
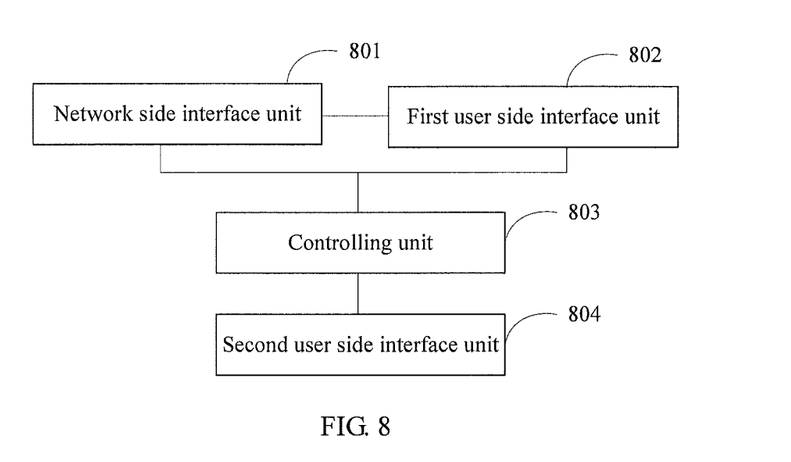
FIG. 8 is a schematic structural diagram of a cache server according to an embodiment of the present invention.

Corresponding to the OTT server, an embodiment of the present invention further provides a cache server, where the cache server is connected to an OTT server. As shown in FIG. 8, the cache server includes:

a network side interface unit 801, configured to receive a notification message, which carries session information, from the OTT server;

a first user side interface unit 802, configured to receive a media data request, which carries session information, from a user terminal;

a controlling unit 803, configured to compare the session information from the OTT server with the session information from the user terminal; and a second user side interface unit 804, configured to send corresponding media data to the user terminal when the session information from the OTT server matches the session information from the user terminal.

For the embodiments of the system and the apparatus, because these embodiments are basically corresponding to the method embodiments, the description is relatively simple. For details about related content, reference may be made to the description of the method embodiments. The above described system embodiments are only for exemplary purpose. The modules described as separate parts may be split physically or may not be split physically. The parts displayed as the modules may be physical modules or may not be physical modules. That is, the parts may be located at one place or distributed on multiple network modules. Some or all of the modules may be selected according to an actual requirement to achieve the purpose of the technical solutions in the embodiments. Persons of ordinary skill in the art may understand and implement the technical solutions without creative efforts.

The preceding description of the disclosed embodiments allows persons skilled in the art to implement or use the present invention. It is apparent for persons skilled in the art to make modifications to these embodiments. General principles defined in the present application can be implemented in other embodiments without departing from the idea or scope of the embodiments of the present invention. Therefore, the embodiments of the present invention are not limited to the embodiments described the specification, but should comply with a widest scope consistent with the principles and novelty disclosed in the present application.

What is claimed is:

1. A method for transmitting media data based on over the top (OTT), comprising:

receiving, by an OTT server, a media data request initiated by a user terminal, wherein the OTT server is connected to at least one cache server;

determining, by the OTT server, a cache server from the at least one cache server according to a location and/or a capability of the at least one cache server;

sending, by the OTT server, a notification message, which carries a first session information, to the user terminal and the determined cache server;

receiving, by the determined cache server and from the user terminal, a media data request which carries a second session information;

determining, by the determined cache server, whether to send media data corresponding to the received media data request by comparing the second session information carried in the media data request with the first session information received by the determined cache server from the OTT, and upon determining the compared second session information carried in the media data request matches the compared first session information received by the determined cache server from the OTT, sending, from the determined cache server to the user terminal, the media data corresponding to the received media data request.

2. The method according to claim 1, wherein the OTT server pushes related media data to the determined cache server in multicast or unicast mode.

3. The method according to claim 1, further comprising after the receiving the media data request initiated by the user terminal, performing, by the OTT server, authentication for the user terminal.

4. The method according to claim 1, wherein the first session information comprises one or a combination of: a user identifier describing user validity, a session identifier describing charging validity, a content identifier describing copyright license validity, copyright information describing a copyright control manner, charging information describing a charging mode, information describing a feedback information requirement upon the completion of a media data service, information describing a duration of a permitted user access state, and the number of concurrent connections.

5. The method according to claim 4, wherein the session information carries an IP address and/or a uniform resource identifier URI of the determined cache server.

6. An over the top (OTT) server, wherein the OTT server is connected to at least one cache server, and the OTT server comprises:
  at least one hardware processor; and
  a memory interfaced to the at least one hardware processor, the memory storing processor executable instructions to control the at least one hardware processor to:
    receive a media data request from a user terminal;
    determine a cache server from the at least one cache server according to a location and/or a capability of the at least one cache server; and
    send a notification message, which carries session information, to the determined cache server and the user terminal to enable the determined cache server to determine whether to provide, in response to a media data request from the user terminal, media data corresponding to the media data request upon determining the session information matches another session information carried in the media data request.

7. The OTT server according to claim 6, wherein the instructions further control the at least one hardware processor to:
  receive statistics information from the determined cache server; and
  charge the user terminal according to the statistics information.

8. A cache server, connected to an over the top (OTT) server, wherein the cache server comprises:
  at least one hardware processor; and
  a memory interfaced to the at least one hardware processor, the memory storing processor executable instructions to control the at least one hardware processor to:
    to receive a notification message, which carries a first session information, from the OTT server;
    receive a media data request, which carries a second session information, from a user terminal;
    compare the first session information from the OTT server with the second session information from the user terminal; and
    send corresponding media data to the user terminal upon determining the first session information from the OTT server matches the second session information from the user terminal.

9. A system for transmitting media data based on over the top (OTT), comprising:
  at least one hardware processor; and
  at least one memory interfaced to the at least one hardware processor, the at least one memory storing processor executable instructions to control the at least one hardware processor to implement:
    a user terminal,
    an OTT server, and
    at least one cache server, wherein:
      the OTT server is configured to:
        receive a first media data request initiated by the user terminal,
        determine, in response to receiving the first media data request, a cache server from the at least one cache server according to a location and/or a capability of the at least one cache server, and
        send a notification message, which carries a first session information, to the user terminal and the determined cache server, and the determined cache server is configured to:
          receive the notification message, which carries a second session information, from the OTT server,
          receive a second media data request, which carries session information, from the user terminal, and
          send corresponding media data to the user terminal upon verifying access permission of the user terminal, by determining the second session information carried in the second media data request matches the first session information carried in the notification message from the OTT server.

10. The system according to claim 9, wherein the OTT server is further configured to perform authentication for the user terminal after receiving the media data request initiated by the user terminal.

11. The system according to claim 9, wherein the determined cache server is further configured to perform authentication for the user terminal.

12. The system according to claim 9, wherein the determined cache server is further configured to report related statistics information of current media data transmission to the OTT server when the user terminal stops obtaining media data.

* * * * *